United States Patent [19]
Hegler et al.

[11] Patent Number: 5,489,403
[45] Date of Patent: Feb. 6, 1996

[54] METHOD FOR WELDING PIPE PIECES MADE OF THERMOPLASTICS

[75] Inventors: Ralph-Peter Hegler; Wilhelm Hegler, both of Bad Kissingen, Germany

[73] Assignee: Wilhelm Hegler, Germany

[21] Appl. No.: 204,635

[22] Filed: Mar. 2, 1994

[30] Foreign Application Priority Data

Mar. 11, 1993 [DE] Germany .............. 43 07 704.8

[51] Int. Cl.⁶ ............................................. B29C 65/34
[52] U.S. Cl. ................ 264/449; 156/304.2; 156/304.3; 156/304.5; 156/304.6; 264/248; 264/249; 264/DIG. 46; 425/508; 425/DIG. 13
[58] Field of Search .................................. 264/248, 249, 264/25, DIG. 46; 425/500, 501, 508, DIG. 13; 156/304.2, 304.3, 304.6, 304.5

[56] References Cited

U.S. PATENT DOCUMENTS

| | | | |
|---|---|---|---|
| 4,436,987 | 3/1984 | Thalmann et al. | 156/304.2 |
| 4,670,078 | 6/1987 | Thalmann et al. | 156/304.2 |
| 4,695,335 | 9/1987 | Lyall | 156/304.2 |
| 4,855,574 | 8/1989 | Lodder et al. | 156/304.2 |
| 4,933,037 | 6/1990 | de Jong | 156/304.2 |
| 5,320,697 | 6/1994 | Hegler et al. | 156/304.2 |

FOREIGN PATENT DOCUMENTS

| | | |
|---|---|---|
| 0378406 | 7/1990 | European Pat. Off. . |
| 0390748 | 10/1990 | European Pat. Off. . |
| 0531750 | 3/1993 | European Pat. Off. . |
| 1738435 | 1/1957 | France . |
| 1757878 | 12/1957 | France . |
| 9100017 | 5/1991 | France . |
| 9107311 | 9/1991 | France . |
| 2-42295 | 2/1990 | Japan . |
| 971021 | 9/1964 | United Kingdom . |

*Primary Examiner*—Mathieu D. Vargot
*Attorney, Agent, or Firm*—Laff, Whitesel, Conte & Saret

[57] ABSTRACT

In a method for connecting pipe pieces of corrugated pipes to form a pipe, which is to be used in particular as a protection pipe for communication cables or light wave guides, external pipe segments are formed by appropriate cutting in the vicinity of the external pipe portions, which external pipe segments are inserted into recesses of welding sleeves. These welding sleeves comprise an outer ring and an inner ring, the inner ring not projecting radially beyond the inner pipe portions into the pipe. At least one of the rings is welded with the external pipe segments.

6 Claims, 3 Drawing Sheets

METHOD FOR WELDING PIPE PIECES MADE OF THERMOPLASTICS

BACKGROUND OF THE INVENTION

FIELD OF THE INVENTION

The invention relates to a method for welding together two pipe pieces of corrugated pipes.

BACKGROUND ART

In communication engineering mainly extruded solid pipes of polyethylene are used, which are formed similar to gas or water pipes. These pipes are often mediaproof, i.e. liquidproof and gasproof, interconnected by welding sleeves. As these pipes merely serve as a protective function for the cables received by the pipes, a so-called corrugated pipe could accomplish the same function at least more cost-effectively, as a corrugated pipe of this type can be manufactured with 40 to 60% less material with an equal annular rigidity based on its corrugated pipe geometry. In addition a corrugated pipe of this type is particularly suitable for being used as a protection pipe in communication engineering, as in the direction of its axis the cable takes its bearing in each case only on the internal pipe portions. The frictional forces, which occur when a cable or a light wave guide is drawn in such corrugated pipe, are by approximately 30% lower than with solid pipes, so that the length of the pipe pieces can be extended, which in turn leads to a reduction of the number of weld joints to be produced.

A welding of such corrugated pipes which is sure to be mediaproof is not known up to this day, as the wall thicknesses thereof are relatively small.

SUMMARY OF THE INVENTION

It is an object of the invention to create a method of the generic type, by means of which a mediaproof connection of pipe pieces made of corrugated pipe is achieved.

This object is attained by providing two pipe pieces, which end with one front surface each in a cylindrical external pipe segment, by pushing the pipe pieces with their external pipe segments into annular recesses of a welding sleeve made of thermoplastics, the welding sleeve partially surrounding each external pipe segment, received by the sleeve, by means of an outer ring and an inner ring, by plastifying the outer ring and/or the inner ring on the one hand and the external pipe segment on the other hand by supplying electric current to the electric heating elements at least in the region being adjacent to each other, by pressing during the plastifying process the pipe pieces towards each other in the direction of the aligning axes until the annular recesses are filled at least substantially with the plastically deformed external pipe segments and by switching off the electric current to connect the external pipe segments with the welding sleeve by cooling down. By the measures according to the invention it is attained that a mechanically rigid and flat welding is produced between the external pipe portions forming in each case a free end of each pipe piece and at least the outer ring or the inner ring of the welding sleeve. The inner ring of the welding sleeve does not project beyond the internal pipe portions radially inwards into the corrugated pipe, so that also in the vicinity of the weld joint no obstruction is created for drawing in cables or light wave guides. The partially inventive further improvements result from the sub-claims.

Further features, advantages and details of the invention will become apparent from the ensuing description of examples of embodiment taken in conjunction with the drawing.

DESCRIPTION OF THE PREFERRED EMBODIMENTS

Figure 1:
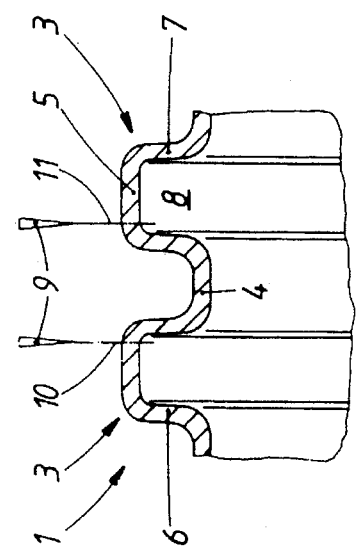
FIG. 1 shows a corrugated pipe in a partial longitudinal cut.

In FIG. 1 a partial section of a so-called corrugated pipe 1 is illustrated, i.e. of a pipe consisting of weldable plastics, for example polyethylene, polypropylene or the like. The corrugated pipe 1 comprises a central longitudinal axis, concentrically to which the corrugated pipe 1 is provided with corrugated portions 3. These comprise substantially circular cylindrical internal pipe portions 4 extending concentrically to the axis 2 and substantially circular cylindrically formed external pipe portions 5 also extending concentrically to the axis 2. An internal pipe portion 4 is connected with the adjacent external pipe portion 5 via flanks 6 or 7, respectively, extending approximately radially to the axis 2. Between an external pipe portion 5 and the flanks 6, 7 adjoining the latter a cavity 8 is formed, which is recessed—viewed from the axis 2— radially outwards in relation to the internal pipe portions 4. The entire corrugated pipe 1 is continuously extruded as a hose and brought into the corrugated form on endlessly traveling calibrating devices according to the so-called vacuum method or the so-called blowing method or vacuum-blowing-method. Calibrating devices of this type are known for example from British Patent 971 021.

As the pipes are produced endlessly, however, cannot be endlessly transported, and as for the purpose of drawing in cables into such pipes the length of a pipe piece is limited, the endless corrugated pipe 1 must be divided. This is performed in the manner that by means of blades 9 the corrugated pipe 1 is divided by cuts 10, 11 on both sides of an inner pipe portion 4 and of the flanks 6, 7 adjoining the portion, so that—as can be seen from FIG. 2—the resulting pipe pieces 12, 13 comprise on their free ends circular cylindrical external pipe segments 5a with front surfaces 14, 15 extending radially to the axis, which—with the pipe pieces 12, 13 being arranged in alignment with another— flush abut on each other, i.e. have an equal inside diameter d and an equal outside diameter D.

Figure 2:
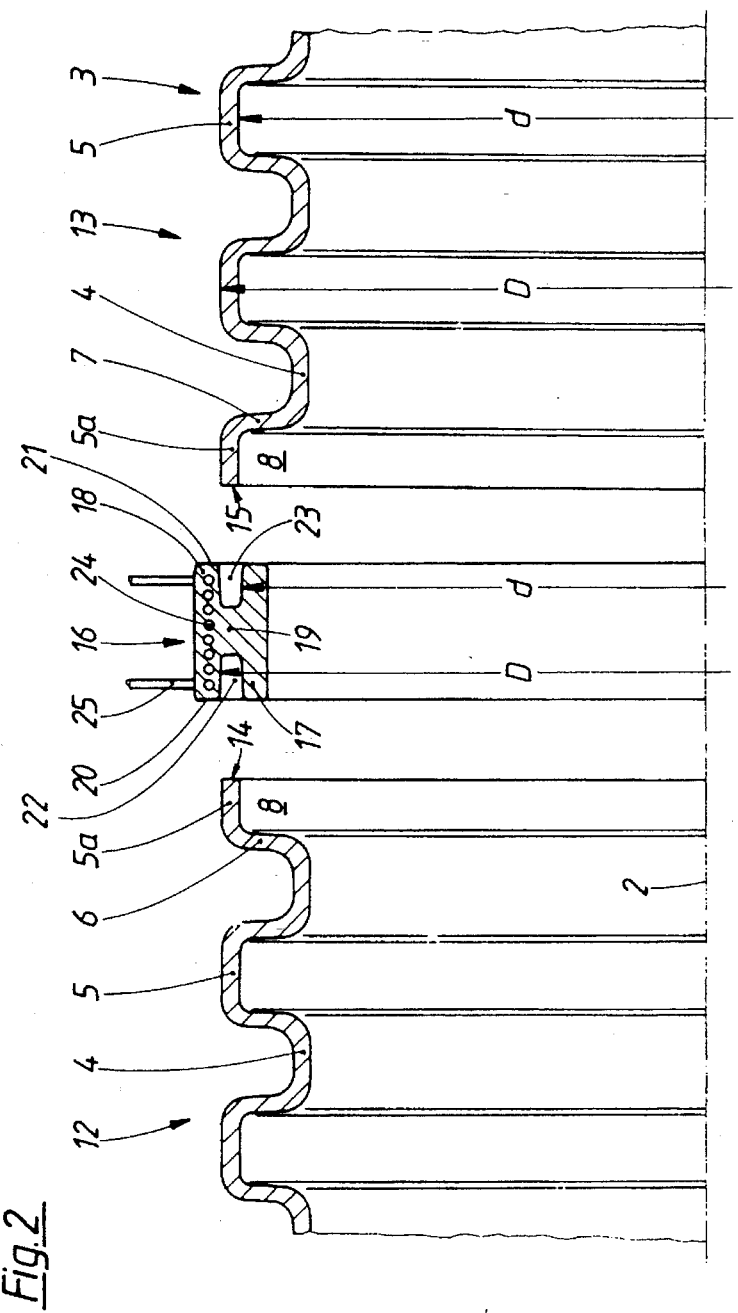
FIG. 2 shows two pipe pieces formed of a corrugated pipe with a welding sleeve before being joined.
Figure 3:
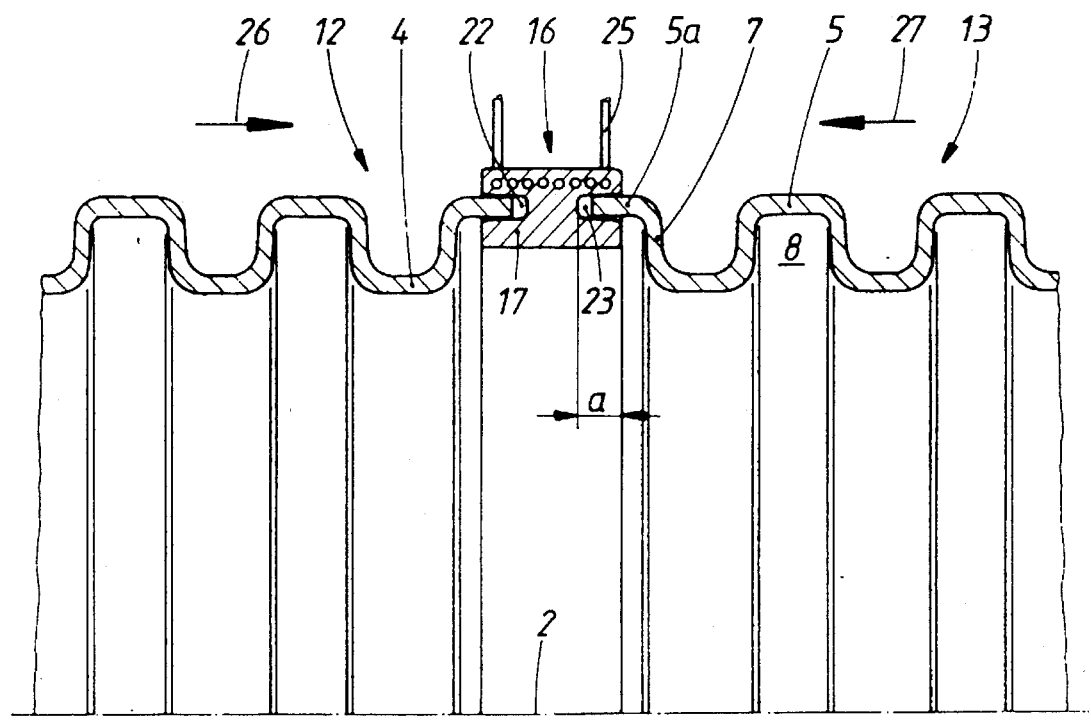
FIG. 3 shows the pipe pieces and the welding sleeve according to FIG. 2 after being pushed together at the start of heating and pressing together.
Figure 4:
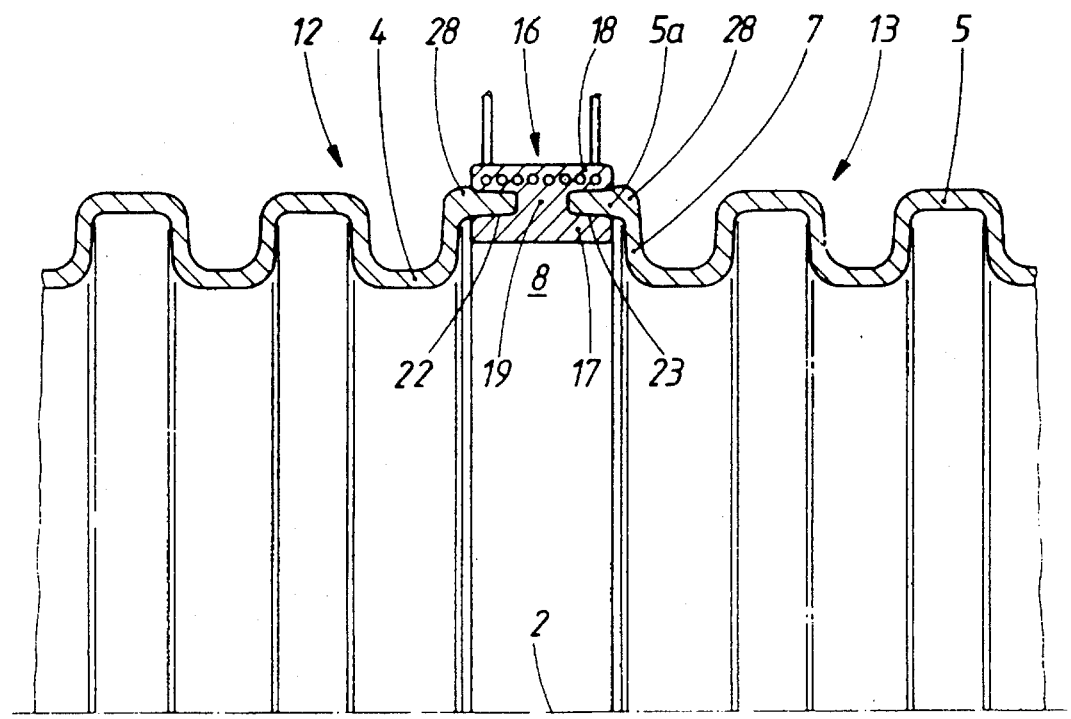
FIG. 4 shows the pipe pieces and the welding sleeve according to FIGS. 2 and 3 at the end of heating and pressing together.

For the purpose of connecting two pipe pieces 12, 13 of this type, a welding sleeve 16 is provided in the example of embodiment according to FIGS. 2 to 4, which consists of an approximately cylindrical inner ring 17 and of a likewise approximately cylindrical outer ring 18 surrounding the inner ring 17 at a distance, which in turn are integrally interconnected by means of a middle web 19. The welding sleeve 16 is made of the same material as the corrugated pipe 1, for example of polyethylene. Between the outer ring 18 and the inner ring 17 two annular recesses 22, 23, open in the direction to the front faces 20, 21, are formed, which recesses 22, 23 are formed slightly tapering in the direction to the middle web 19. In the vicinity between the middle web 19 and the respective front face 20 or 21 their largest diameter is D and their smallest diameter is d, so that when inserting the two pipe pieces 12, 13 with their external pipe segments 5a comprising the front surfaces 14, 15 into the recesses 22, 23, the external pipe segments 5a arrive in the position shown in FIG. 3, in which the front surfaces 14, 15 are still spaced away from the middle web 19.

In the outer ring 18 of the welding sleeve 16 an electric resistance heating 24 is disposed, which can be connected with a power source via connection lines 25. When heating this resistance heating 24, the material of the outer ring 18 and in part the middle web 19 are melted. Furthermore, the regions, contacting the outer ring 18, of the elements, located in the recesses 22, 23, of the external pipe segments 5a are plastified. The inner ring 17 of the welding sleeve 16, however, is not plastified. The two pipe pieces 12, 13 being pressed in direction towards each other in accordance with the arrows 26, 27 during the heating and plastifying or melting process, the external pipe segments 5a located in the recesses 22, 23 are fully pressed into these recesses 22, 23 and on this occasion are being deformed in such a manner that they penetrate into the recesses 22, 23 over the full length a of the latter, until their front surfaces 14, 15—now having changed shape—abut on the middle web 19 and are also welded with the latter, as can be seen from FIG. 4. From FIG. 4 it can also be seen that the external pipe segments 5a welded together with the welding sleeve 16 comprise a slightly upset portion 28 outside of the welding sleeve 16 at the transition to the respective adjacent flank 6 or 7, respectively. After the connection shown in FIG. 4 of the two pipe pieces 12, 13 with the welding sleeve 16 has been attained, current is cut off so that the plastified plastics solidify in this position, by means of which a mediaproof, i.e. a liquidproof and gasproof welding of the two pipe pieces 12, 13 is achieved. As the inner ring 17 of the welding sleeve 16 is not heated, it is not being deformed under the welding pressure in the direction of the arrows 26, 27. As can be seen in particular from FIG. 4, the inner ring 17 does not project radially inwards beyond the internal pipe portion 4.

Figure 5:
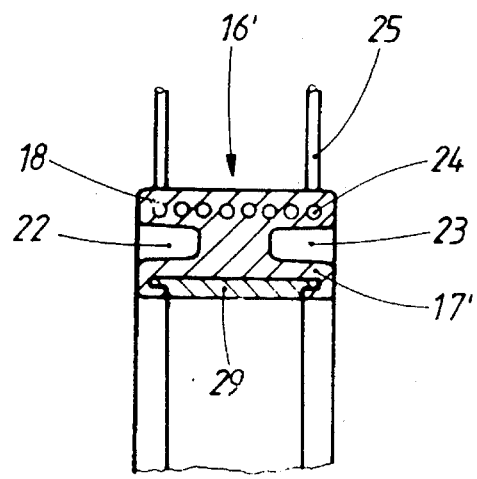
FIG. 5 shows a modified form of embodiment of a welding sleeve.

The welding sleeve 16' shown in FIG. 5 differs from the sleeve shown in FIGS. 2 to 4 only in an annular stiffening inlay 29, embedded allover in the inner ring 17' and made for example of metal, being arranged in the inner ring 17', by means of which stiffening inlay 29 the stiffness of the inner ring 17' and thus of the welding sleeve 16' in all is enhanced during the temperature load, i.e. during welding. Compared to the embodiment according to FIGS. 2 to 4 this stiffness is higher, although in that case also a considerable stiffness is maintained based on the nonheating of the inner ring 17.

Figure 6:
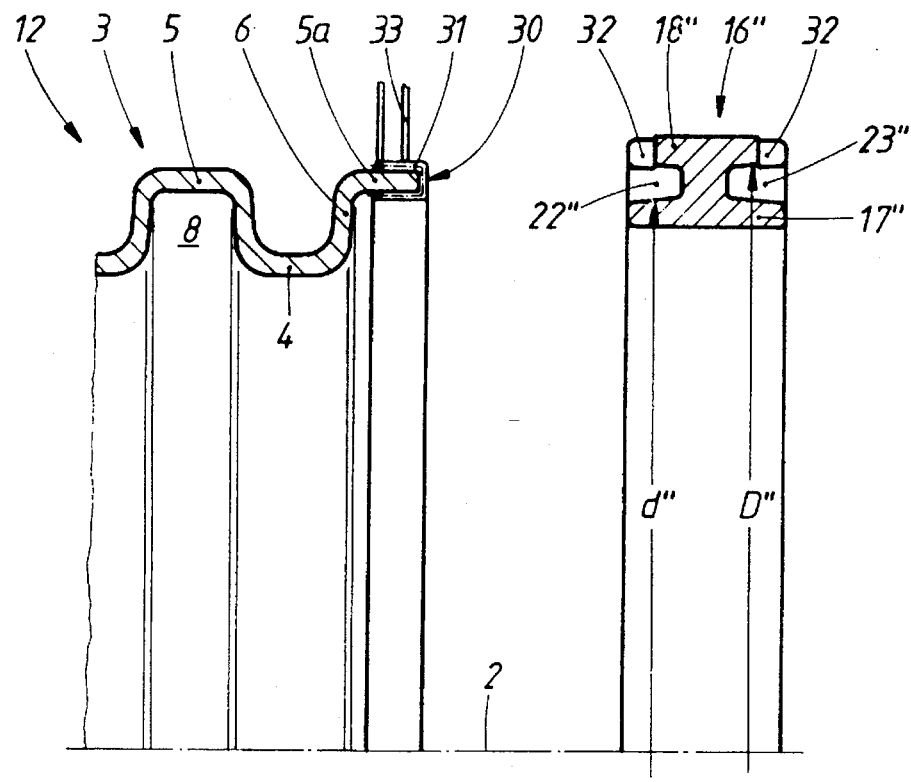
FIG. 6 shows a pipe piece with a welding sleeve and an electric resistance heating separated from the welding sleeve and FIG. 7 shows a further form of embodiment of a welding sleeve.

In the embodiment according to FIG. 6 the welding sleeve 16" is not provided with an electric resistance heating, i.e. also its outer ring 18" consists only of the material of the corrugated pipe 1. An electric resistance heating 30 is provided for each pipe piece, of which only one pipe piece 12 is illustrated. This electric resistance heating 30 is formed by a heater band 31 consisting of resistance wires, which heater band 31 is U-shaped bent, as can be seen from FIG. 6. In this manner it can also be pushed over the front surface 14 of the pipe piece 12 onto its external pipe segment 5a. This external pipe segment 5a together with the electric resistance heating 30 is pushed into the annular recess 22" of the welding sleeve 16", the outer ring 18" of which comprises a cutout 32 for the connection lines 33 of the resistance heating 30. As can be seen from FIG. 6, a corresponding cutout 32 is associated to the other annular recess 23", too. The largest diameter D" and the smallest associated diameter d" each time in the middle region of each recess 22" or 23", respectively, is a little larger or a little smaller, respectively, than the corresponding diameter D or d, respectively, of the external pipe segment 5a, as the latter in addition is enlarged or reduced, respectively, by the electric resistance heating 30. With this embodiment the surface regions, resting on each other, of the external pipe segment 5a and of the wall portions, delimiting the recess 22" or 23", respectively, of the welding sleeve 16" are directly plastified by the resistance heating 30. The stiffness of the welding sleeve 16" is remained in this case by the external region of the outer ring 18" and the internal region of the inner ring 17" being not or only slightly heated and thus being not plastified.

Figure 7:
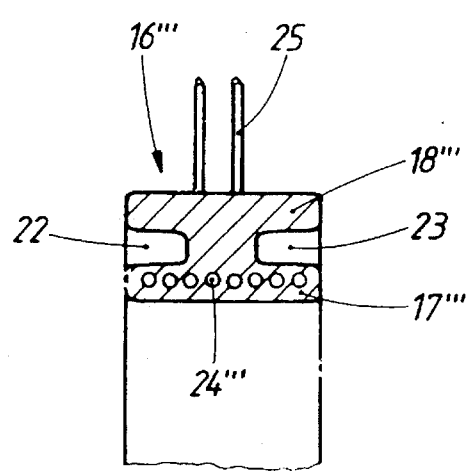

It may occur that a pipe, which consists of pipe pieces 12, 13, which are interconnected by a welding sleeve 16 or 16' or 16", is inserted or installed at places, where the outer ring 18, 18" of the welding sleeve 16, 16', 16" must not project beyond the corrugated portions 3. In such a case this outer ring 18 or 18", respectively, must be peeled after the welding process. With the object of nevertheless achieving a satisfactory welding in such a case, welding may be effected according to FIG. 6. As in this case also the inner ring 17" is welded with the external pipe segment 5a, the outer ring 18" can be peeled after the welding is produced. However, also a welding sleeve 16''' according to FIG. 7 can be used, which differs from the welding sleeve 16 according to FIGS. 2 to 4 only in the electric resistance heating 24''' being formed in the inner ring 17''', whereas no such heating is arranged in the outer ring 18'''. In this case the outer ring 18''' assumes the task to confer the necessary stiffness to the welding sleeve 16''' during the welding process. This outer ring 18''' is then peeled after the welding process.

What is claimed is:

1. A method for welding together two pipe pieces of corrugated pipes comprising:

providing a first thermoplastic pipe piece and a second thermoplastic pipe piece, each pipe comprising corrugated portions with internal pipe portions and external pipe portions alternately succeeding in the direction of a central longitudinal axis and with substantially radial flanks interconnecting the said two portions and said first pipe piece ending in a first front surface of a cylindrical external pipe segment, and said second pipe piece ending in a second front surface of a cylindrical external pipe segment, providing a thermoplastic welding sleeve comprising an outer ring and an inner ring, which outer ring and which inner ring are arranged concentrically to said central longitudinal axis and which said outer ring and which said inner ring define a first annular recess and a second annular recess, which two recesses are separated by a middle web from each other, which middle web interconnects said outer ring and said inner ring, and wherein said inner ring radially to said central longitudinal axis is located exclusively between said external pipe segments and said internal pipe portions of said pipe pieces, providing electrical heating elements adjacent to at least one of said outer ring and said inner ring, pushing said external pipe segment of said first pipe piece into said first annular recess of said welding sleeve and said external pipe segment of said second pipe piece into said second annular recess of said welding sleeve, plastifying at least one of said outer ring and said inner ring and said external pipe segments of said first and second pipe pieces by actuating the electric resistance heating elements with electric current, pressing said two pipe pieces towards each other while deforming said external pipe segments until said external pipe segments fill at least substantially said two annular recesses and switching off the electric current and cooling said welding sleeve and said external pipe segments to connect said external pipe segments with said welding sleeve.

2. A method according to claim 1, wherein said electric heating element consists of an electric resistant heating element arranged in said outer ring.

3. A method according to claim 1, wherein said electric heating element consists of an electric resistance heating element arranged in said inner ring.

4. A method according to claim 1, wherein said welding sleeve is provided with an inner ring which has a stiffening inlay.

5. A method according to claim 1, wherein an electric resistance heating element separated from the welding sleeve is provided, which electric resistance heating element is placed on said external pipe segments to be inserted into the respective recess.

6. A method according to claim 1, wherein said annular recesses slightly taper from front faces of said welding sleeve towards said middle web of said welding sleeve.

* * * * *